(12) United States Patent
Seshadri et al.

(10) Patent No.: US 10,025,561 B2
(45) Date of Patent: Jul. 17, 2018

(54) AUTOMATED SOFTWARE APPLICATION GENERATION AND DEPLOYMENT

(71) Applicant: Solvebot, Inc., Bellevue, WA (US)

(72) Inventors: Praveen Seshadri, Bellevue, WA (US); Brian Sabino, Redmond, WA (US); Philip L. Garrett, Redmond, WA (US)

(73) Assignee: SOLVEBOT, INC., Bellevue, WA (US)

( * ) Notice: Subject to any disclaimer, the term of this patent is extended or adjusted under 35 U.S.C. 154(b) by 87 days.

(21) Appl. No.: 15/014,942

(22) Filed: Feb. 3, 2016

(65) Prior Publication Data

US 2016/0224321 A1 Aug. 4, 2016

Related U.S. Application Data

(60) Provisional application No. 62/111,535, filed on Feb. 3, 2015.

(51) Int. Cl.
| | |
|---|---|
| *G06F 9/44* | (2018.01) |
| *G06F 8/30* | (2018.01) |
| *G06F 8/60* | (2018.01) |
| *G06F 17/24* | (2006.01) |
| *H04L 29/08* | (2006.01) |
| *G06F 8/61* | (2018.01) |

(52) U.S. Cl.
CPC ............... *G06F 8/30* (2013.01); *G06F 8/60* (2013.01); *G06F 8/61* (2013.01); *G06F 17/246* (2013.01); *H04L 67/34* (2013.01)

(58) Field of Classification Search
CPC ..... G06F 8/30; G06F 8/60; G06F 8/61; G06F 17/246; H04L 67/34

USPC .................................................. 717/101–109
See application file for complete search history.

(56) References Cited

U.S. PATENT DOCUMENTS

| | | | | |
|---|---|---|---|---|
| 9,645,723 | B2 * | 5/2017 | Chang | .................... G06F 3/0485 |
| 2013/0151381 | A1 * | 6/2013 | Klein | ................... G06Q 30/0641 |
| | | | | 705/27.1 |
| 2014/0046923 | A1 * | 2/2014 | Ruble | ...................... G06T 15/10 |
| | | | | 707/706 |

OTHER PUBLICATIONS

Bhawani, "App to Access Edit & Create DOC, DOCX, XLS, XLSX, PPT, PPTX Files on Android", May 2012, retrieved from http://androidadvices.com/app-access-edit-create-doc-docx-xls-xlsx-ppt-pptx-files-android/, 8 pages.*

Patil, "Creating/Reading an Excel file in Android", Apr. 2013, retrieved from http://www.cuelogic.com/blog/creatingreading-an-excel-file-in-android , 9 pages.*

(Continued)

*Primary Examiner* — Ted T Vo

(74) *Attorney, Agent, or Firm* — Davis Wright Tremaine LLP

(57) ABSTRACT

The disclosure includes systems and methods for automated software generation and deployment, which can include automatically generating, without human interaction, an application based on one or more structured data source, which can include a table, spreadsheet, database, or the like. Applications can be generated for smartphones or other suitable devices. Generating an application automatically and without human intervention can include extracting a schema from a data source and generating an application based on the extracted schema.

16 Claims, 9 Drawing Sheets

(56) References Cited

OTHER PUBLICATIONS

Bluestein, "Generate Excel Spreadsheets in Native Mobile Apps", Jan. 2014, retrieved from https://blog.xamarin.com/generateexcelspreadsheetsinnativemobileapps/ , 7 pages.*

RecoveryTools, "Guidelines to Convert Excel Contacts into Android", Nov. 2014, https://web.archive.org/web/20141104192152, retrieved from http://www.recovery-tools.org/ms-excel-to-vcard/android.html, 7 pages.*

* cited by examiner

Fig. 6a

| RowNumber | Company Name | Job Number | Job Name | Work Area | Phone # | To be completed Date |
|---|---|---|---|---|---|---|
| [Number] | [Name] | [Number] | [Name] | [Text] | [Phone] | [Date] |

| RowNumber {Number {"MaxValue": null, "MinValue": null, "StepValue": null, "Valid_if": null, "Show_if": null, "Required_if": null}} | Company Name {[Name {"Valid_if": null, "Show_if": null, "Required_if": null}]} | Job Number {[Number {"MaxValue": null, "MinValue": null, "StepValue": null, "Valid_if": null, "Show_if": null, "Required_if": null}]} | Job Name {[Name {"Valid_if": null, "Show_if": null, "Required_if": null}]} | Work Area {[Text {"Valid_if": null, "Show_if": null, "Required_if": null}]} | Phone # {[Phone {"Callable": true, "Textable": true, "TextMessage": null, "Valid_if": null, "Show_if": null, "Required_if": null}]} | To be completed Date {[Date {"Valid_if": null, "Show_if": null, "Required_if": null}]} | Com plete {[Yes/No {"Val null, "Sho null, "Req null}]} |
|---|---|---|---|---|---|---|---|
| 2 | Nostromo Corp | 191367 | Office Remodel | Foyer | 4258651111 | 11/15/2014 | 19 |
| 3 | Auriga Corp | 234522 | Eco Upgrade | External insulation | 4258652223 | 12/19/2014 | 15 |
| 4 | Blue Sun | 576920 | Hazardous Waste Removal | External property | 3604849283 | 01/29/2016 | 17 |
| 5 | Tyrell Corp | 452753 | Plumbing and HVAC | Full internal site | 2867894857 | 03/10/2016 | 9 |
| 6 | Weyland-Yutani | 465237 | Spackle and paint interior foyer | Foyer | 4256784655 | 12/08/2015 | 19 |
| 7 | Cyberdine Systems | 3236654 | Install major appliances in kitchen | Kitchen | 2867465637 | 11/24/2016 | 24 |
| 8 | LexCorp | 125058 | Floor coverings incl. carpet and tile | Hallways and restrooms | 3604756383 | 09/17/2016 | 30 |
| 9 | Sateco Inc | 9573353 | Insulation and drywall panels | Throughout | 2867859384 | 11/04/2015 | 20 |
| 10 | Fiorina Corp | 8573375 | Install new windows | Throughout | 4253485930 | 06/03/2016 | 5 |
| 11 | Oscorp Industries | 567389 | Install floor and ceiling joists | Throughout | 3606583859 | 02/14/2016 | 12 |

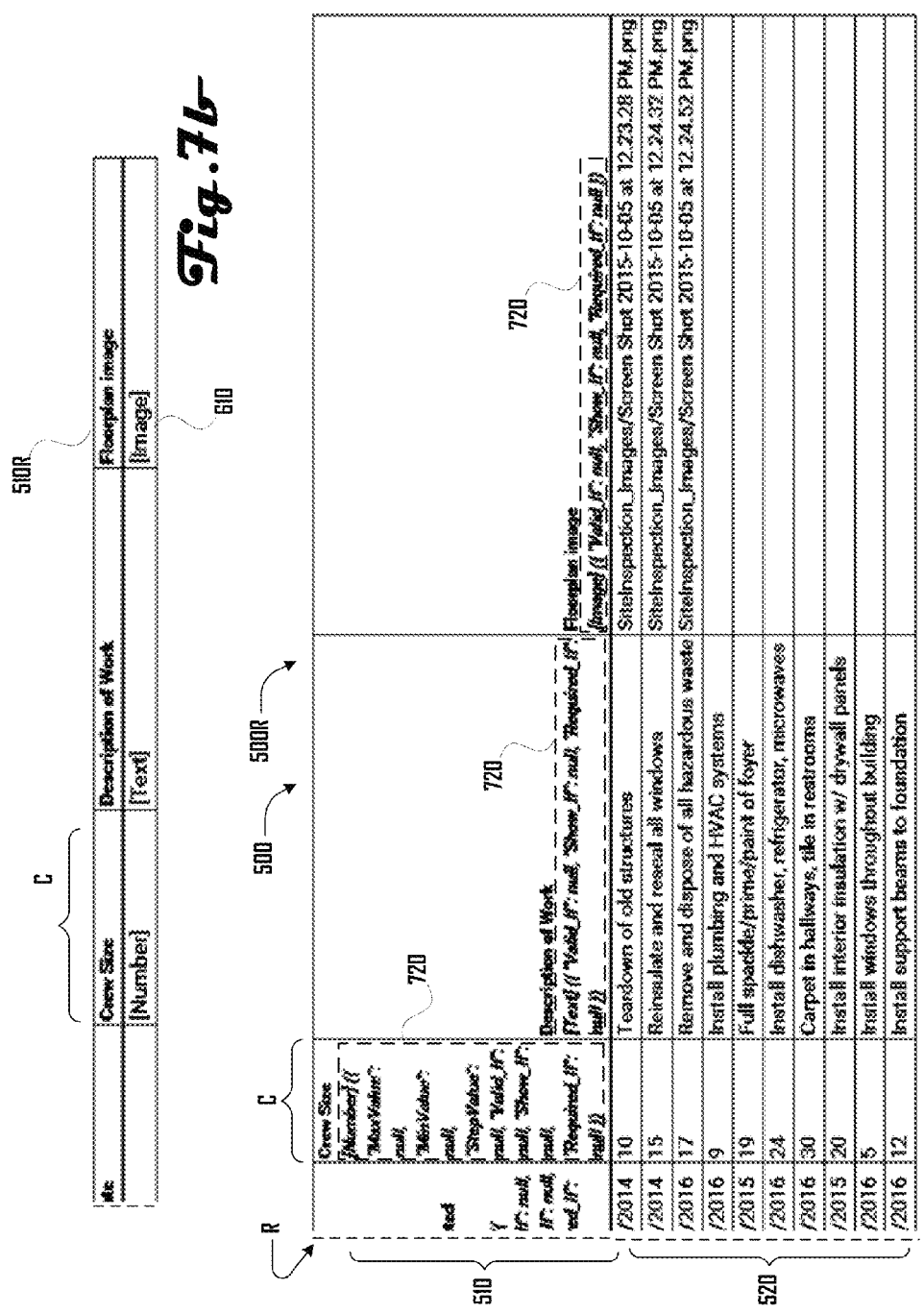

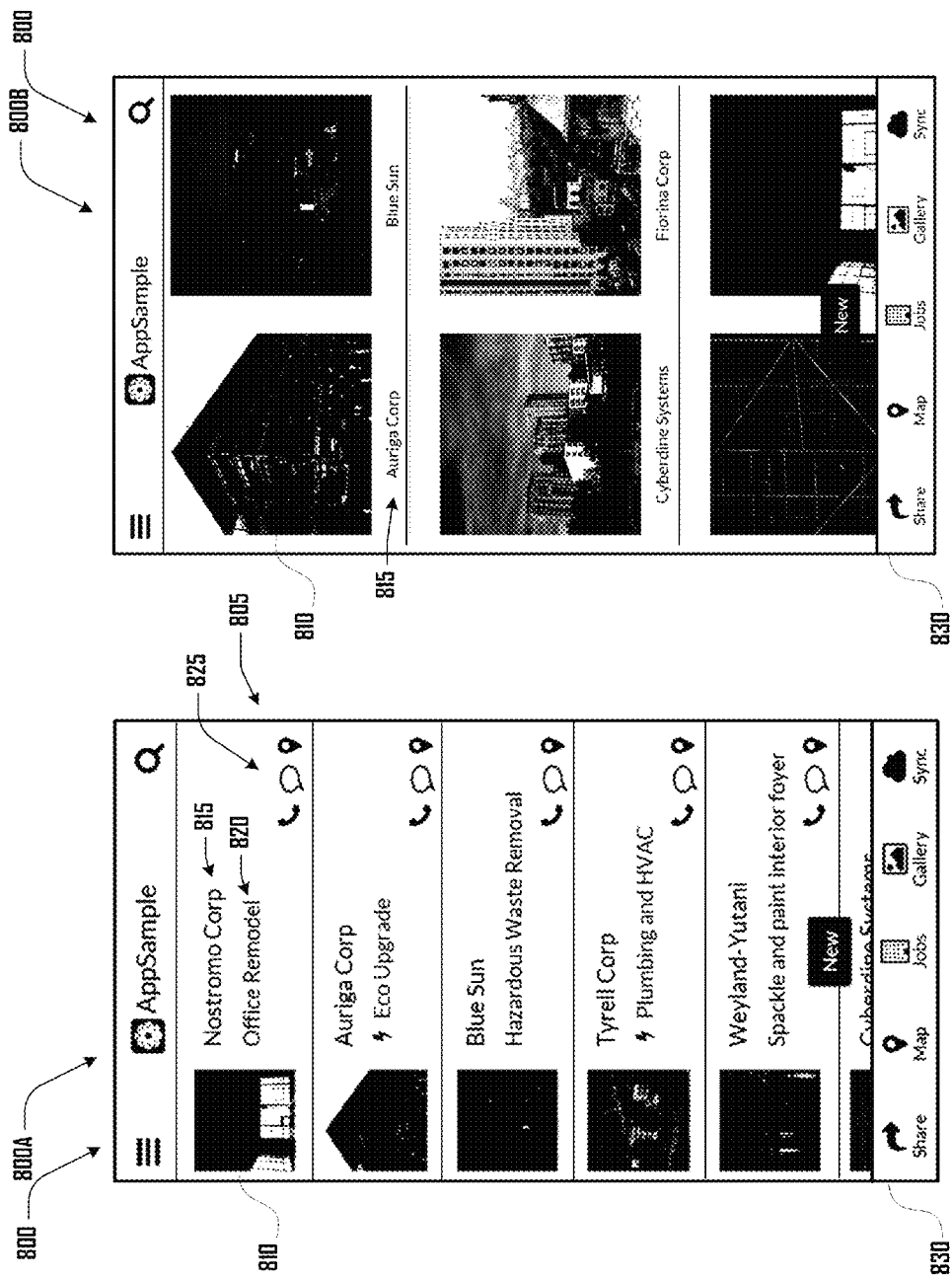

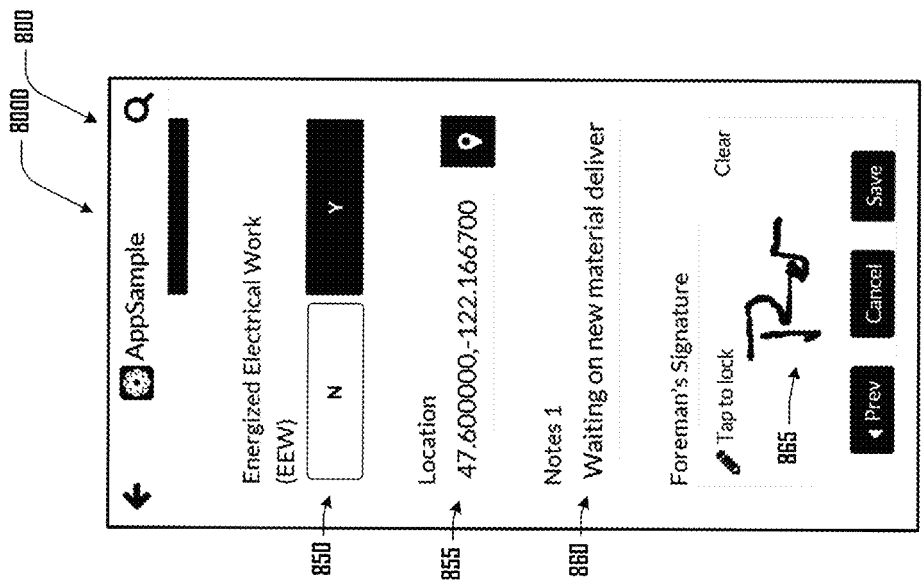
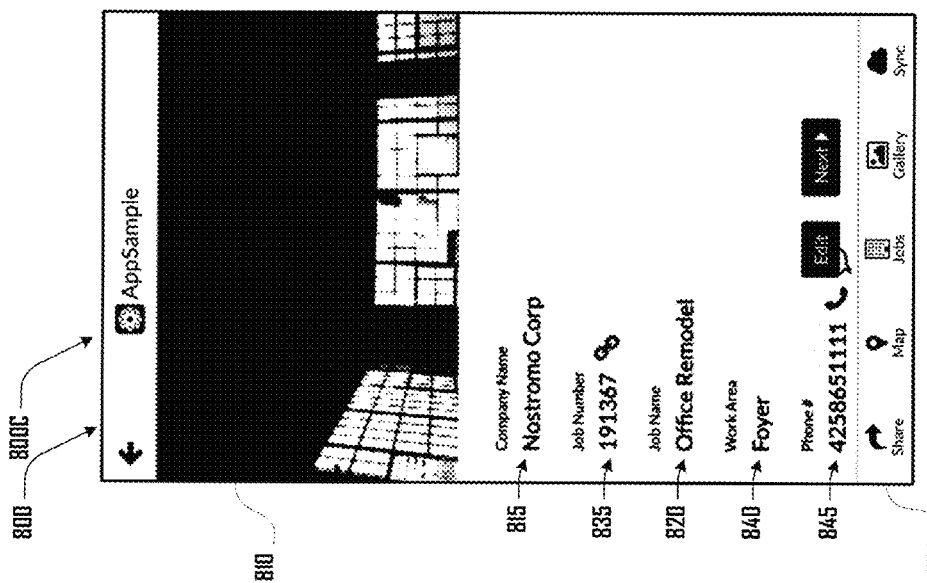

AUTOMATED SOFTWARE APPLICATION GENERATION AND DEPLOYMENT

CROSS-REFERENCE TO RELATED APPLICATIONS

This application is a non-provisional of, and claims priority to, U.S. Provisional Application Ser. No. 62/111,535 filed Feb. 3, 2015. This application is hereby incorporated by reference in its entirety and for all purposes.

BACKGROUND

Mobile apps are software applications designed to run on variety of device form factors, from larger devices like laptops, tablets and phones, to smaller devices like smart gadgets, wearable devices, and connected sensors. Typically, a mobile device runs a mobile operating system ("mobile OS") and provides a mechanism for the users of the device to extend the function of the device by installing mobile apps. These mobile apps are created by "app developers" for use by the app's "end users." Mobile apps may exhibit a wide range of functionality, including but not limited to displaying information to the end user, capturing information from the end user or the end user's environment, and communicating information between the app and some backend service.

BRIEF DESCRIPTION OF THE DRAWINGS

FIGS. 6a and 7a illustrate first and second portions of the header row of the spreadsheet of FIG. 5 including a row illustrating metadata determined for each column that indicates a data type for each column.

FIGS. 6b and 7b illustrate first and second portions the spreadsheet of FIG. 5 including metadata determined for each column that indicates a data type for each column and determined schema for each column of data.

FIGS. 8a, 8b, 9a and 9b illustrate example embodiments of an application interface generated based at least in part on the data source spreadsheet illustrated in FIG. 5.

Figure 1:
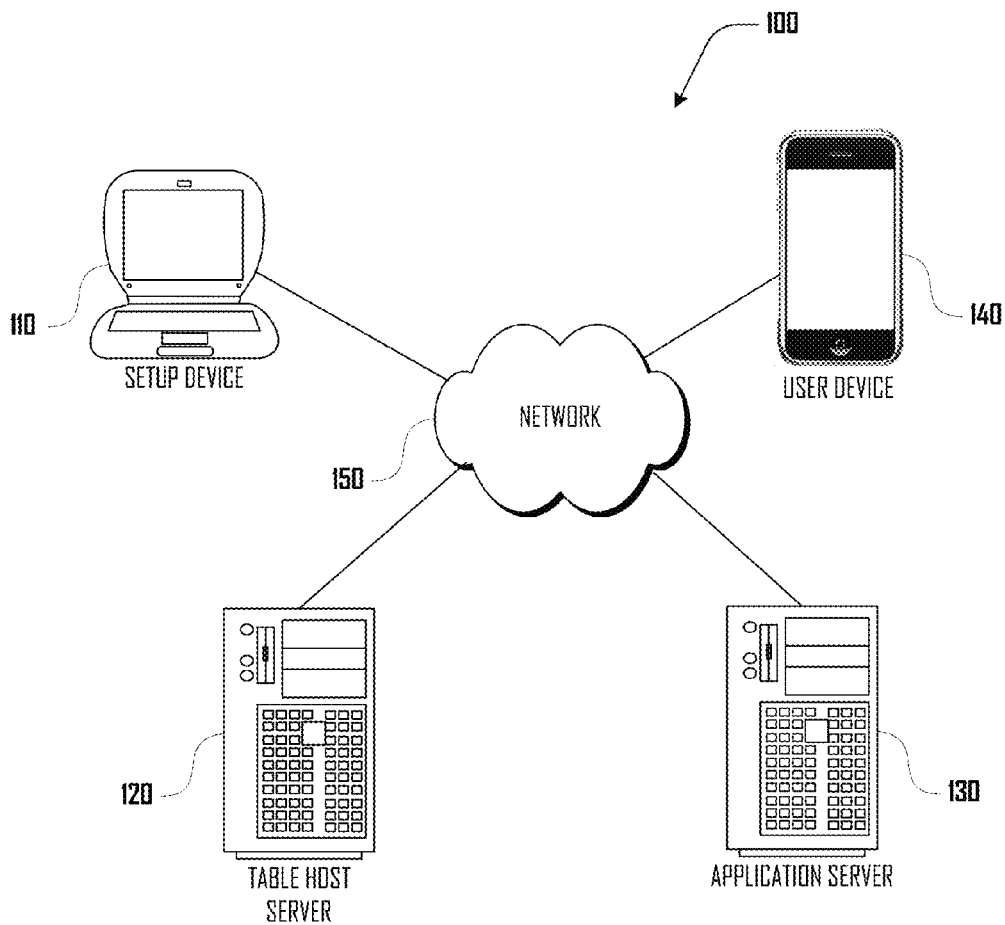
FIG. 1 is an exemplary network diagram illustrating an embodiment of an automated software generation and deployment system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure includes systems and methods for automated software generation and deployment, which can include automatically generating, without human interaction, an application based on one or more structured data source, which can include a table, spreadsheet, database, or the like. Applications can be generated for smartphones or other suitable devices.

Generating an application automatically and without human intervention can include extracting a schema from a data source and generating an application based on the extracted schema. As discussed in more detail herein, extracting a schema can include identifying a location of structured data in a data source, determining a column or row type for each identified column or row of structured data, identifying data constraints of the structured data, determining enumerated types for the structured data based on identified data constraints, determining structured data relationships based on column types and enumerated types and generating an application based on the structured data and structured data relationships. In various examples, such steps can occur sequentially and automatically without human interaction.

Turning to FIG. 1, an example embodiment of the automated software generation and deployment system 100 is shown as comprising a setup device 110, a table host server 120, an application server 130 and a user device 140, which are operably connected via a network 150. While the setup device 110 and user device 140 are shown in this example as comprising a laptop computer and smartphone respectively, in further embodiments, the setup device 110 and/or user device 140 can comprise any suitable device, including a desktop computer, wearable device, gaming device, television, smartphone, laptop computer, tablet computer, or the like. Additionally, the table host server 120 and application server 130 can comprise one or more server or other suitable device, including a cloud-based server system, or the like. Additionally, in various embodiments, there can be any suitable plurality of any of the setup device 110, table host server 120, application server 130 and/or user device 140 as described in further detail herein.

In some embodiments, any of the setup device 110, table host server 120, application server 130 and/or user device 140 can be the same device. For example, in one embodiment, the setup device 110 can also be a user device 140. Similarly, in one embodiment, the application server 130 can also be a table host server 120.

Figure 2:
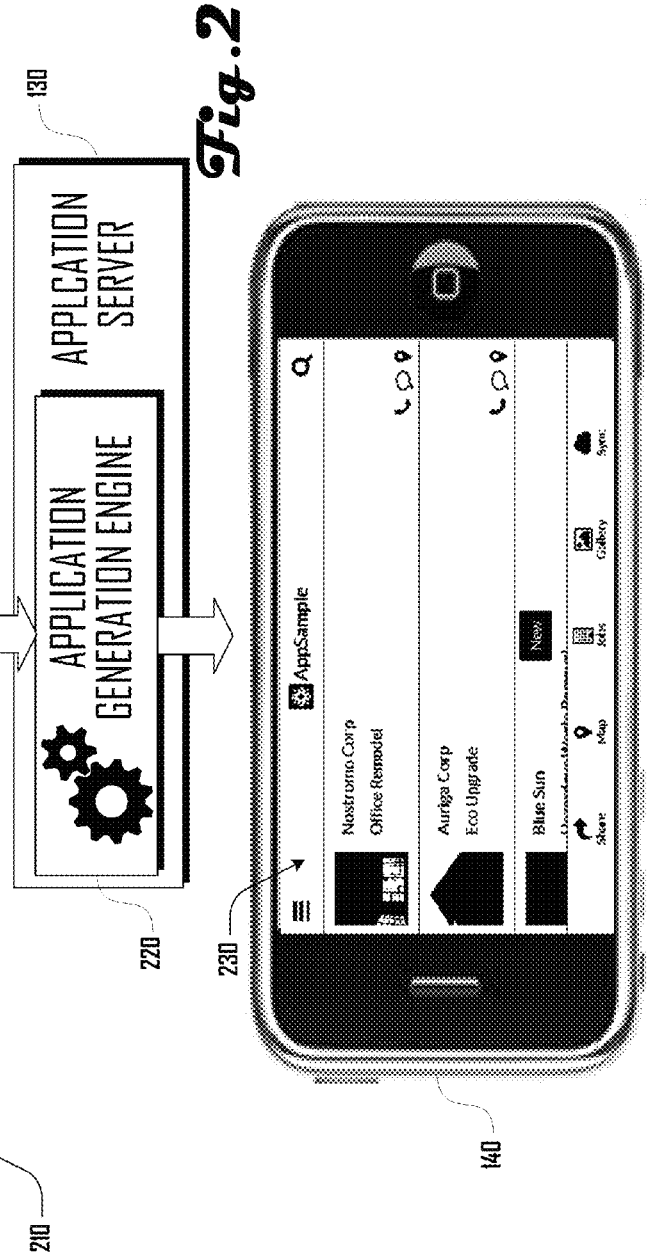
FIG. 2 is an exemplary illustration of a method of automated software generation and deployment.

Turning to FIG. 2, in one example embodiment, a table 210 can be stored on a table host server 120 and data from the table 211 can be sent to the application server 130, where an application generation engine 220 can generate an application 230 that can be deployed on a user device 140. As described herein, a table 210 can comprise various suitable forms of structured data, including a spreadsheet, database, table, or the like. In some embodiments, the table host server 120 can comprise a table or spreadsheet hosting service such as Google Drive (Google, Inc.), Dropbox (Dropbox, Inc.), Office365 (Microsoft, Inc.), Box (Box, Inc.), Smartsheet (Smartsheet Inc.), or the like. Similarly, a spreadsheet or table can be of any suitable format, including .xls, .xlsx, .xlsm, .xlsb, .xml, .dll, .odf, .fodt, .csv, .dif, .tsv, .tab, and the like.

In further embodiments, the table host server 120 can comprise various suitable databases or data hosts such as Salesforce (Salesforce, Inc.), Facebook (Facebook, Inc.), LinkedIn (LinkedIn, Inc.), and the like. Accordingly, although some example embodiments include use of one or more spreadsheet or table, any suitable type of structured data can be used in further embodiments.

Figure 3:
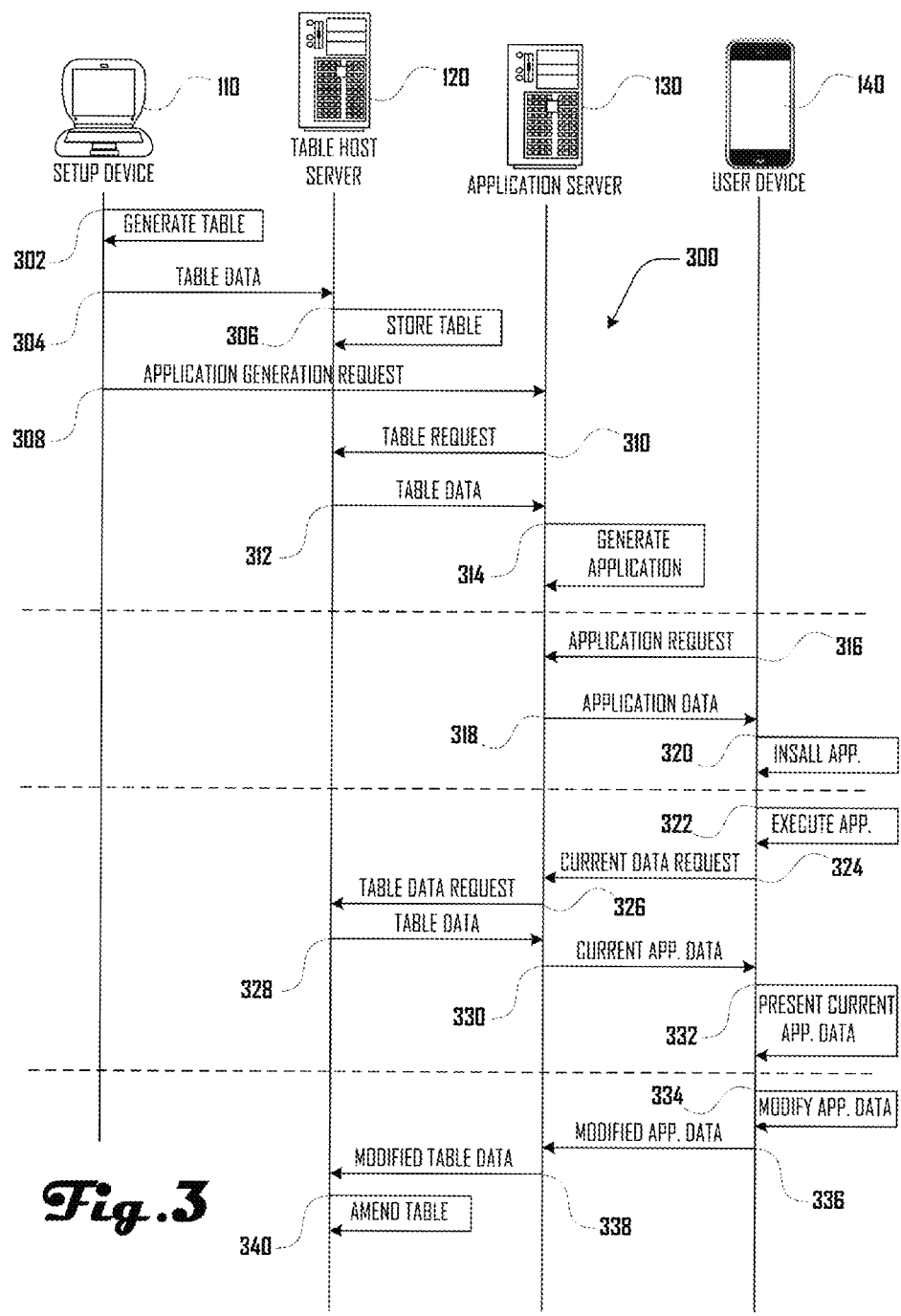
FIG. 3 is an exemplary data flow diagram illustrating a set of communications among a setup device, table host server, application server and user device for automated software generation and deployment.

Turning to FIG. 3, a series of communications 300 are illustrated between the setup device 110, table host server 120, application server 130 and user device 140 during generation of an application, installation of an application, and use of the application. The communications begin where the setup device 110 generates 302 a table and table data is sent 304 to the table host server 120 where the table data is stored 306. For example, a setup user can generate a spreadsheet via Microsoft Excel at the setup device 110 that includes a set of data, and this spreadsheet can be uploaded 204 and stored 306 at the table host server 120. In further examples, the setup device 110 can be used to generate a spreadsheet directly at the table host server 120 and data can be input into this spreadsheet at the table host server 120.

Returning to the communications 300, the setup device 110 sends 308 an application generation request to the application server 130, which sends 310 a table request to the table host server 120. The table host server 120 sends 312 table data to the application server 130, where an application is generated 314. In various embodiments, an application generation request can include identification of one or more structured data source, including a spreadsheet that is stored or hosted at the table host server 120. Such an identification can include sufficient permissions that allow the application server 130 to access, edit and obtain data from such a spreadsheet, which may include a Uniform Resource Identifier (URI), a username, a password, and the like.

As discussed in greater detail herein, an application can be generated 314 at the application server 130 in various suitable ways, including automatically without user intervention. Additionally, in some embodiments, various types of applications can be generated based on one or more data source such as a spreadsheet. For example, as illustrated in FIGS. 2, 8a, 8b, 9a and 9b an application for a mobile device such as smartphone can be generated; however, in further embodiments, an application for a tablet computer, gaming device, desktop computer, wearable device, webpage, or the like can be generated 314.

Returning to the communications 300, the user device 140 can send 316 an application request to the application server 130 and application data can be sent 318 to the user device where the application can be installed 320. The user device 140 can send 316 an application request to the application server 130 in various suitable ways. For example, in one embodiment the user device 140 can click a link (URI) that facilitates downloading 318 and installation 320 of the application at the user device 140. Such a link can be initially provided to the setup device 110 when an application is generated 314 and that link can be sent to various devices where installation of the application is desired, which can include the user device 140. This can be desirable for rapid deployment of an application to a plurality of user devices 140.

In some embodiments, a generated 314 application can be a sub-application or piggyback off of a primary application to support rapid deployment of the application. For example, in various embodiments, applications may only be eligible for installation onto a user device after scrutiny by an application authority, which determines that the application meets certain quality standards (e.g., candidate applications for the iPhone or other Apple device may require submission to and approval by Apple before they are available for download on iTunes). Such a process can be time consuming, often taking a number of days, weeks or months.

Accordingly, in some embodiments, installation 320 of a generated 314 application can occur via a primary application that has already been approved by and is available via an application source (e.g., already approved by Apple and available on iTunes). For example, in such embodiments, installation 320 can comprise downloading and installing an approved primary application, which may be associated with the application server 130, and then downloading 318 generated application data via the primary application and installing and running the generated application in association with the primary application.

In such embodiments, such a sub-application or piggybacking application can act like and appear to be a primary application despite running or being installed with assistance of the primary application. For example, such a sub-application can have a unique launch icon and a separate user interface relative to a primary application. Accordingly, by acting as a sub-application or by piggybacking off of a primary application that has already been approved by an application authority, deployment of generated applications as discuss herein can be rapid and can occur without the cumbersome and time consuming process of approval by the application authority.

Returning to the communications 300, the user device 140 can execute 322 the application and send 324 a current data request to the application server 130, which can submit 326 a table data request to the table host server 120. Table data can be sent 328 to the application server 130, which can send 330 current application data to the user device 140, where current application data is presented. In some embodiments, installation 320 of the application can include installation of current table data. In further embodiments, subsequent execution of the application can trigger an update of the application, application updates can be pushed to the user device 140 and/or application updates can be periodically requested from the application server 130 and/or the table host server 120 directly.

Returning to the communications 300, the user device 140 can modify 334 application data and modified application data can be sent 336 to the application server 130. Modified table data can be sent 338 to the table host server 120, where the table is amended 340. For example, in various embodiments, there can be a plurality of user devices 140 and each of the user devices 140 can be configured to interact with the application such that data stored within the table or spreadsheet at the table host server 130 is modified, added, replaced, deleted, copied, or the like. Accordingly, in such embodiments, a plurality of user devices 140 can have access to and be presented with updated data present in the table or spreadsheet at the table host server 130 and also be configured to modify, add, replace, delete, and/or copy such data, which can be shared with the other user devices 140.

For example, as illustrated in FIG. 9b, and as described in more details herein, an application interface 800D can be configured for a user device to receive input including a button selection 850, location data 855, text notes 860, signature 865, and the like. As discussed herein, such data can be stored in text form in a spreadsheet or table, which can include a URI that points to an image, webpage, video, audio or other media.

In further embodiments, the setup device 110 can modify data of a spreadsheet or table present on the table host server 120, which can be shared with one or more user device 140. In one example, the setup device 110 can be located at a home office location and a plurality of user devices 140 can be using a generated application at various remote locations. In various embodiments, the setup device 110 and each of the user devices 140 can interact with the application to cause changes to the shared spreadsheet, which allows the changes to be shared and viewed among these devices.

Figure 4:
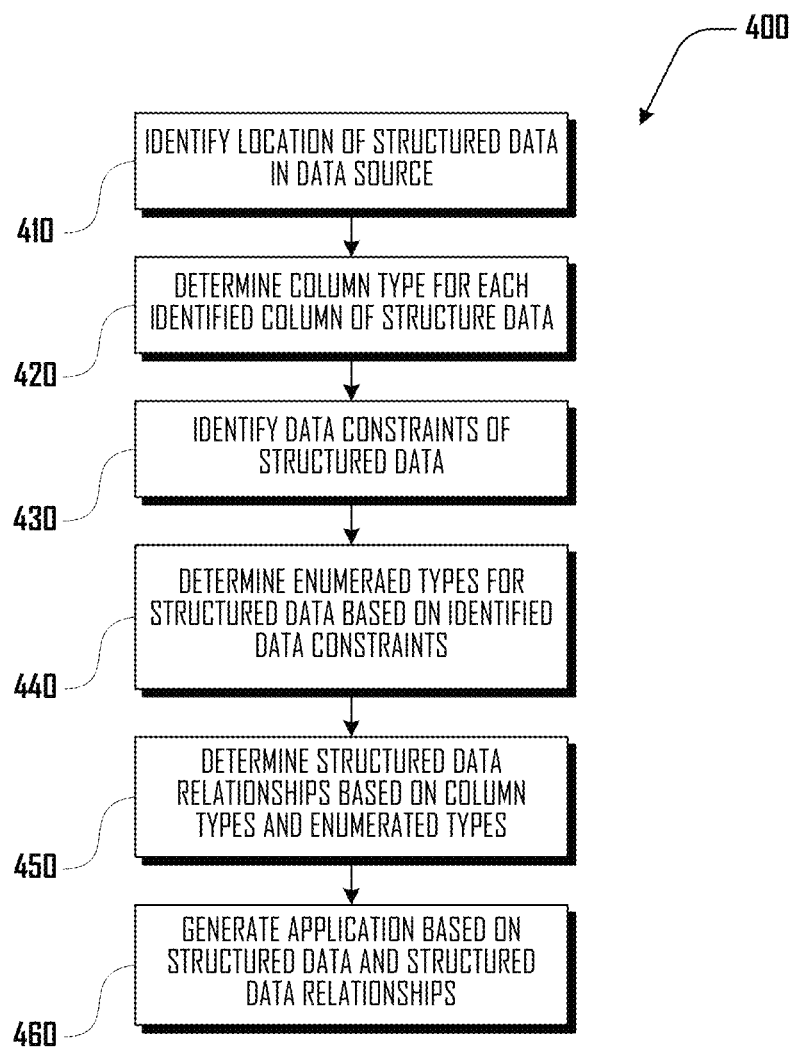
FIG. 4 is an exemplary block diagram illustrating a method of automated software generation in accordance with an embodiment.
Figure 5:
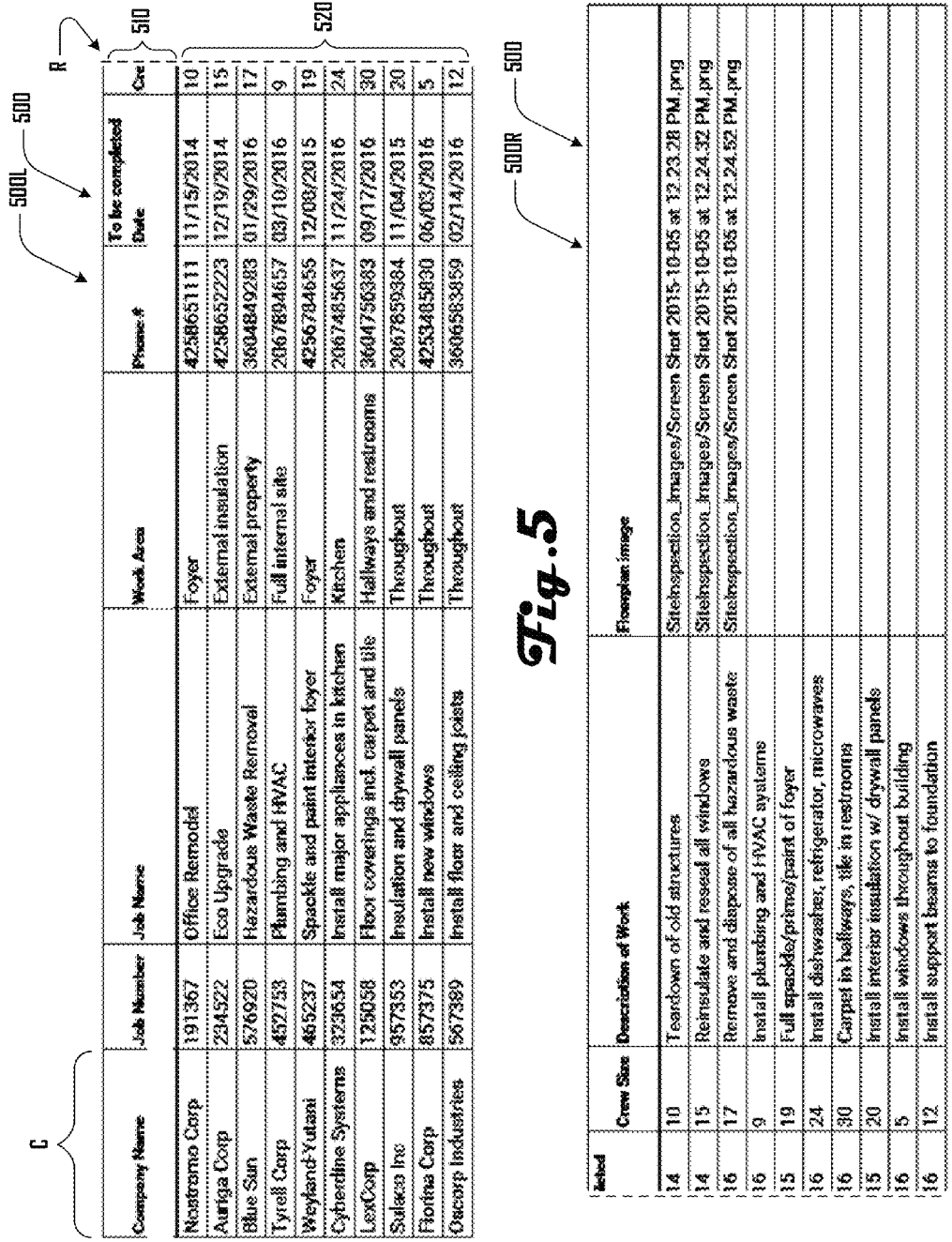
FIG. 5 illustrates a first and second portion of a spreadsheet that can be used as a data source.

FIG. 4 illustrates a method 400 of automatically generating an application without human user interaction. The method 400 begins where a location of structured data in a data source is identified 410. As discussed herein, in some embodiments a data source can comprise a table or spreadsheet. For example, FIG. 5 illustrates left and right portions 500L, 500R of a spreadsheet 500 that comprises a matrix of cells defining a plurality of columns C and rows R. Using this spreadsheet 500 as an example, identification can include identifying rows R and/or columns C that include data, identifying rows R and/or columns C that include header data, rows R and/or columns C that include content data, and the like. For some data sources, rows R, columns C or cells may not contain any data and identifying a location of structured data can include identifying and disregarding rows R, columns C and/or cells that are empty, where no data is present, or where irrelevant data is present.

However, empty cells or cells without data can still be identified as a source of structured data. For example, the "Floorplan image" column C includes three cells where data is present and seven cells where data is not present. Lack of data in these seven cells can indicate an empty field for a program or the like. In the example of FIG. 5, the identified structured data includes a header row 510 and a set of content rows 520. Identification of the location of structured data in a data source can be performed in various ways, including via heuristics, machine learning or the like. In various embodiments, identification of the location of structured data in a data source can be performed automatically and without human interaction.

Returning to the method 400 a column type of each identified column of structured data is determined 420. Again using the example of FIG. 5, a column type can be determined based on the data present in the header row 510 and/or content rows 520. For example, FIGS. 6a and 7a illustrate identified column types for the structured data illustrated in FIG. 5. Specifically, as shown in FIGS. 6a and 7a, a determined column type 610 is illustrated that include the "Company Name" column being identified as a "[Name]" column; the "Job Number" column being identified as "[Number]"; the "Work Area" column being identified as "[Text]"; the "To be completed" column being identified as a "[Date]"; the "Floorplan image" column being identified as an "[Image]", and the like. Although specific examples of column type are illustrated in FIGS. 6a and 7a, these should not be construed to be limiting on the types of column types that can be identified. Additionally, in further embodiments, row types can be identified depending how data is structured.

Returning to the method 400, data constraints of structured data are identified 430 and enumerated types of structured data are determined 440 based on the identified data constraints. Using the example of structured data of FIGS. 5, 6a, 6b, 7a and 7b, the column having the header of "phone #" can be identified as having a data type of "[Phone]" which can have a constraint of being a set of 10 numbers; the first three numbers being of only a limited set of combinations (e.g., due to area code limitations) and the last seven digits being of only a limited set of combinations (e.g., due telephone number limitations).

In another example, a column type can be identified as "[State]" and the data can be determined to have a constraint of being one of the 50 U.S. states (and territories), with the enumerated types being the two letter postal code for each of the 50 states. In a further example, a column type can be identified as having an input limited to "Yes" or "No." Alternatively, a column type can be identified as having an input limited to "Yes", "No" or Maybe. In a still further example, a column type can be identified as "[Card Suit]" with enumerated types being "Club," "Diamond," "Heart," and "Spade."

Identification of constraints of structured data and/or determining enumerated types of structured data based on the identified data constraints can be performed in various ways, including via heuristics, machine learning, or the like. In various embodiments, identification of constraints of structured data and/or determining enumerated types of structured data based on the identified data constraints can be performed automatically and without human interaction.

Returning to the method 400 of FIG. 4, structured data relationships are determined 450 based on column types and enumerated types and an application is generated 460 based on the structured data and determined structured data relationships. For example, the structured data illustrated in FIG. 5 can be a portion of structured data used to generate a program comprising the user interfaces illustrated in FIGS. 8a, 8b, 9a and 9b. Metadata 620 indicating determined structured data relationships is illustrated in FIGS. 6b and 7b in accordance with this example.

In some embodiments determining structured data relationships can include identifying one or more key column or data set. For example, as illustrated in FIGS. 6a and 6b the column "Job Number" has been identified as the key column or data set, which is indicated by the key symbol 630 and asterisks 640. In such an example, identification of a key column or data set can generate a hierarchy or relationships between columns or data sets, which can translate into how such columns or data sets are presented in a user interface 800. For example, FIG. 8a shows a first interface 800A a set of jobs listed in rows 805, with each row 805 including an image 810, company name 815, job name 820 and menu buttons 825. Here, the image 810, company name 815, and job name 820 in each row 805 can correspond to data present in the structured data (e.g., structured data as shown in FIGS. 5, 6b and 7b.) with each row 805 corresponding to a given job number. The menu buttons 825 can provide functionalities or further displays related to entries in the structured data, which in the example shown in FIG. 8a can include calling or displaying a telephone number, sending a text message, and showing a location on a map based on an address, coordinates, or the like.

A program can provide alternative displays of data present in structured data or items corresponding to data present in structured data. For example, the bottom menu 830 shown on the interfaces 800 can provide access to alternative displays and the like. FIG. 8b illustrates an interface 800B including a plurality of image 810 displayed above a company name associated with the image.

FIG. 9a illustrates another example of an interface 800C that includes an image 810, company name 815, job name 820, job number 835, work area 840 and phone number 845. In the example, interface of FIG. 9a, each of the presented elements is associated with the same job number. In contrast, FIGS. 8a and 8b illustrate elements associated with a plurality of job numbers grouped together by job number.

FIG. 9b illustrates a further example of an interface 800D that includes energized electrical work buttons 850, a location field 855, a notes field 860 and a signature field 865. This example interface 800D further illustrates that the interface can allow a user to modify and/or input data, which can be added to or cause changes in a hosted spreadsheet or other data source. For example, a user can select "Yes" or "No" of the energized electrical work buttons 850, which may create an entry or change an entry in a hosted spreadsheet or other data source. Additionally a user can input a signature 865 via the signature field 865, which can add or modify an entry in a hosted spreadsheet or other data source. In some embodiments, an entry for a signature can generate an image, which can be stored on a server, and a URI to this stored image can be stored in the hosted spreadsheet or other data source. Alternatively, in some embodiments, an image can be generated and stored directly in a hosted spreadsheet or other data source.

Determining structured data relationships based on column types and enumerated types can be done in any suitable way including via heuristics, machine learning, or the like. In various embodiments, determining structured data relationships based on column types and enumerated types can be performed automatically and without human interaction.

Similarly, generating an application based on structured data and structured data and structured data relationships can be done in any suitable way including via heuristics, machine learning, or the like. In various embodiments, generating an application based on structured data and structured data and structured data relationships can be performed automatically and without human interaction.

For example, generating an application can include generating and storing program code that is executable to present and interface 800 on a user device 140, which can include any suitable device. For example, as discussed herein, such program code can be stored or hosted on an application server 130 and/or user device 140. Images, videos, audio, text, or the like can be stored at the table host server 120 in the data source, on the application server 130, and/or on a user device 140. Alternatively, such images, videos, audio, text, or the like can be stored on any suitable server or device and be referenced or called by any of the application server 130 and/or user device 140 as necessary.

Generating an application can include using one or more application template or application shell, and such an application template or application shell can be selected from a library based on a variety of criteria. Characteristics of the data within a data source, identified relationships of data within a data source, determined column types, identified data constraints, determined enumerated types, and the like can be used to select an application template or application shell. Such an application template or application shell can define various characteristics of an application including color scheme, menu icons, position of application elements, font scheme, default images, and the like. For example, where data includes keywords that are indicative of content related to a law firm or financial services, a template can be selected that has a professional look and feel.

As discussed herein, generating an application from one or more data source can occur automatically and without human interaction. In other words one or more of the steps 410-460 illustrated in FIG. 4, or the like, can occur automatically in series without intervening human interaction. For example, in one embodiment, a user can select one or more data source (e.g., one or more hosted spreadsheet, table or database), initiate an application generation process, and the application can be generated as discussed herein without further interaction from the user. In other words, the user can request that an application be generated and the application can be automatically generated without further interaction from the user.

In some embodiments, a user can customize an application before and/or after automatically generating the application without user interaction. For example in one embodiment, before generation of an application, a user can select an application template, an application setup, or otherwise indicate preferences or settings for the configuration, layout or look of a generated application. In another embodiment, after generation of an application, a user can modify, customize, or edit a generated program including indicating a key data column for a data set, or providing preferences or settings for the configuration, layout or look of a generated application. For example, in some embodiments, an application can be generated automatically without user interaction as discussed herein, and a user can then tweak, modify, edit, configure or customize the generated application to further suit the needs of the user.

In some embodiments, a plurality of versions of an application can be generated automatically without human interaction and a user can select one or more versions for deployment or as a seed for further application generation without human interaction. For example, in one embodiment, a plurality of variations of an application can be generated for selection by a user and the user can select the best version for implementation. In another embodiment, a first round of candidate application variations can be generated and a user can select one or more best variations and such a selection can be used to automatically generate a second round of candidate application variations from which the user can choose. In some embodiments, the user can iteratively generate a plurality of successive rounds of candidate applications until a single desired application is selected and deployed.

As discussed herein machine learning can be used to train a system for generating an application automatically without user human interaction. In various examples, such machine learning can comprise and/or use supervised, unsupervised or semi-supervised machine learning. For example, machine learning can comprise and/or use a neural net, a support vector machine, a Bayesian network, a genetic algorithm, a regression algorithm, an instance-based algorithm, a clustering algorithm, a decision tree algorithm, or the like.

A system for generating an application can be trained in various suitable ways. For example, a plurality of versions of an application can be automatically generated from training data that can include one or more data sources such a spreadsheet or table. The plurality of versions can be ranked or "best" versions can be selected by a trainer to train a system. As discussed above, such training can be integrative with multiple rounds of candidate selection and automatic generation of applications based the candidate selection. Additionally, in further embodiments, the actions and/or selections of users when customizing, setting up or selection of candidate versions of an application can be used to train a system for automatic generation of applications without human interaction.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:
1. A method for automated software generation and deployment comprising:
   identifying, by a setup device, a data source stored on a data source host server that is separate from the setup device;

initiating, by the setup device, an application generation request at an application server that is separate from the setup device and data source host;

generating automatically without human interaction, by the application server, executable software code for an application based on the identified data source, the generating including the application server:

identifying a location of structured data in the data source;

determining at least one of a column type or row type for rows or columns identified in the data source;

identifying data constraints of the structured data;

determining enumerated types of the structured data based on the identified data constraints;

determining a plurality of structured data relationships based on the determined at least one of a column type or row type for rows or columns identified in the data source; and generating executable software code for an application based on the structured data and the determined plurality of structured data relationships; and providing, by the application server, the generated executable software code for the application to a user device that is separate from the setup device, data source host and application server.

2. The method for automated software generation and deployment of claim 1, wherein the data source comprises a spreadsheet.

3. The method for automated software generation and deployment of claim 2, wherein the spreadsheet defines a matrix of cells arranged in a plurality of rows and columns.

4. The method for automated software generation and deployment of claim 1, wherein the data source comprises a plurality of spreadsheets.

5. The method for automated software generation and deployment of claim 1, wherein the application is configured to run at the user device as a sub-application of a primary application installed on the user device.

6. The method for automated software generation and deployment of claim 1, wherein generating executable software code for the application comprises using a system trained via machine learning.

7. The method for automated software generation and deployment of claim 1, wherein the application is configured to modify data of the data source via the application server.

8. The method for automated software generation and deployment of claim 1, wherein identifying the data source stored on the host server comprises providing a password for accessing the data source on the host server.

9. The method for automated software generation and deployment of claim 1, further comprising providing the generated executable software code for the application to a plurality of separate user devices that are each separate from the setup device, data source host and application server.

10. A computer implemented method for automated software generation comprising:

generating, by a computer system, automatically without human interaction, executable software code for an application based on an identified data source, the generating by the computer system including:

identifying, by the computer system, a location of structured data in the data source;

determining, by the computer system, at least one of a column type or row type for rows or columns identified in the data source;

identifying, by the computer system, data constraints of the structured data;

determining, by the computer system, enumerated types of the structured data based on the identified data constraints;

determining, by the computer system, a plurality of structured data relationships based on the determined at least one of a column type or row type for rows or columns identified in the data source; and generating, by the computer system, executable software code for the application based on the structured data and the determined plurality of structured data relationships.

11. The method for automated software generation and deployment of claim 10, wherein the data source comprises a spreadsheet.

12. The method for automated software generation and deployment of claim 11, wherein the spreadsheet defines a matrix of cells arranged in a plurality of rows and columns.

13. The method for automated software generation and deployment of claim 10, wherein the data source comprises a plurality of spreadsheets.

14. The method for automated software generation and deployment of claim 10, wherein generating executable software code for the application comprises using a system trained via machine learning.

15. The method for automated software generation and deployment of claim 10, wherein the application is configured to run at a user device as a sub-application of a primary application installed on the user device.

16. The method for automated software generation and deployment of claim 10, wherein the application is configured to modify data of the data source.

* * * * *